June 23, 1942.   S. LATANSKI   2,287,181
WATER HEATER
Filed Oct. 30, 1940   2 Sheets-Sheet 1

INVENTOR.
STEVE LATANSKI.
BY Louis Chayka

June 23, 1942.   S. LATANSKI   2,287,181
WATER HEATER
Filed Oct. 30, 1940   2 Sheets-Sheet 2

INVENTOR.
STEVE LATANSKI.
BY Louis Chayken

Patented June 23, 1942

2,287,181

UNITED STATES PATENT OFFICE 2,287,181

WATER HEATER

Steve Latanski, Chicago, Ill.

Application October 30, 1940, Serial No. 363,392

2 Claims. (Cl. 122—23)

The conventional arrangement for heating water for family use calls for a tank, which when placed in the kitchen, is quite obtrusive. When placed in the cellar, as sometimes is the case, then frequent trips to the cellar may be required to light gas under the heater or to turn it off. To eliminate these bothersome features, I have built my improved heater described in this application. The improvement consists to a great extent in a novel arrangement of elements which comprise my heater. Another purpose of my invention was to provide a heater which in spite of its compactness and to a great extent because of it, would be more efficient. My further purpose was to combine my heater with the kitchen sink, so that the heater and the sink would form one unit. I shall now describe my invention with more detail with reference to the accompanying drawings, in which:

Similar numerals refer to similar parts throughout the several views.

Figure 1:
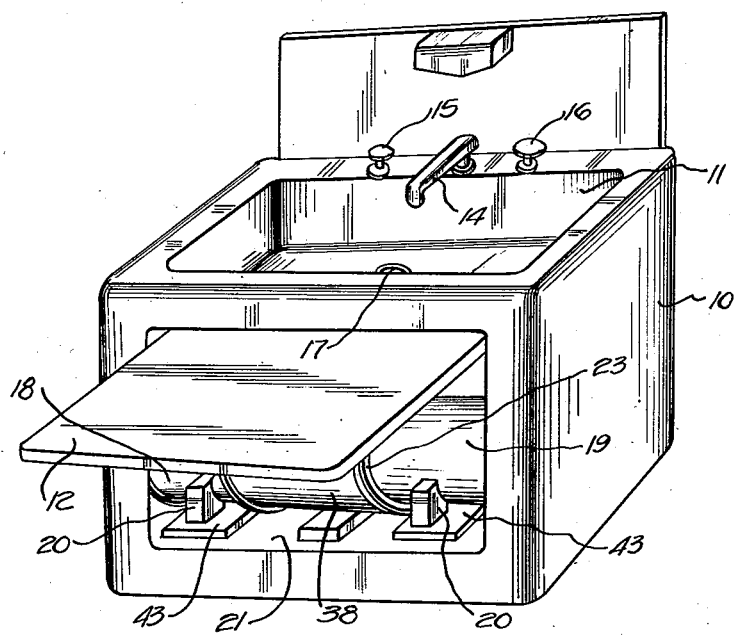
Fig. 1 shows a perspective view of my heating unit combined with a kitchen sink.
Figure 2:
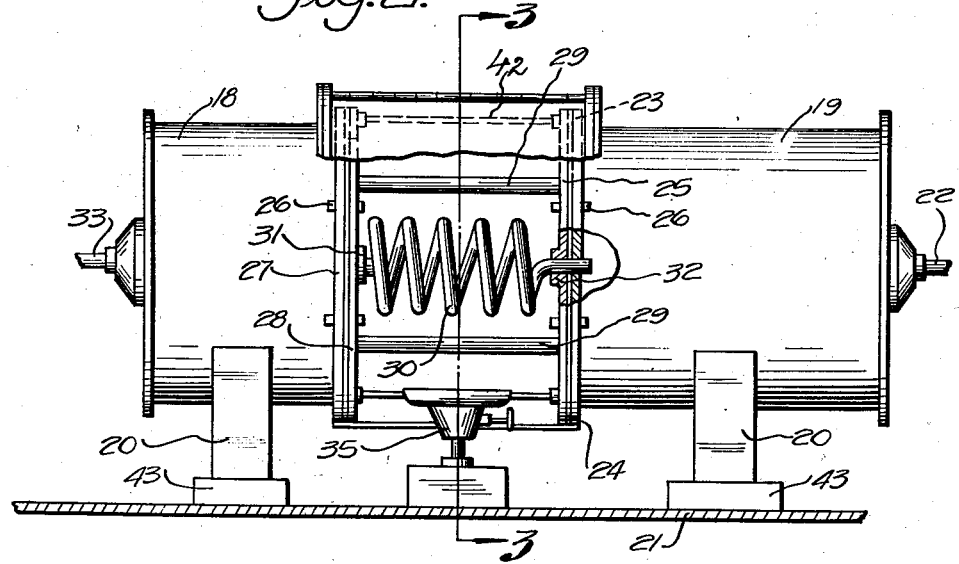
Fig. 2 shows a side elevation of my heating unit.
Figure 3:
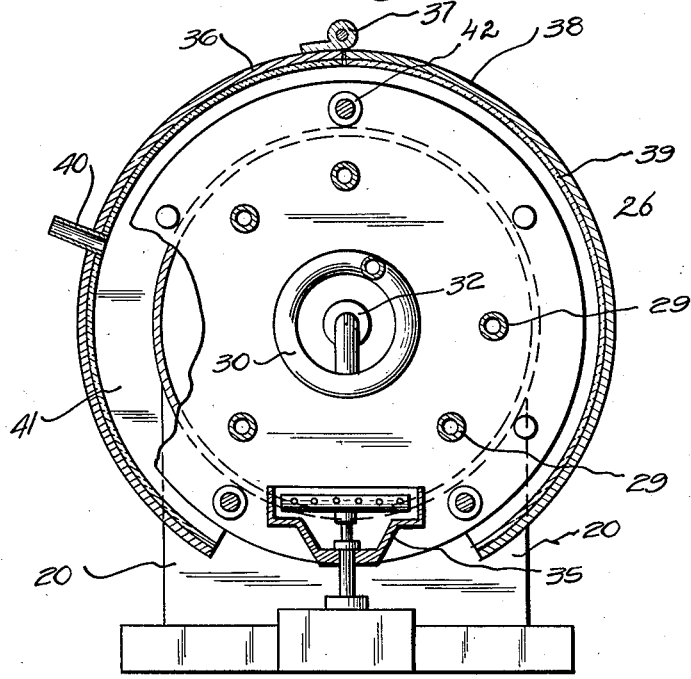
Fig. 3 shows a sectional view of the heating unit on line 3—3 of Fig. 2.

It will be noted that sink 10, to which I have reference, is made in the form of a box-like cabinet, in which 11 is a basin of conventional design on top of said cabinet, and that said cabinet is provided with door 12 in front thereof. The sink is equipped with a faucet 14 and valves 15 and 16. 17 shows an outlet from the sink, while the heating unit within the cabinet and under basin 11 is indicated generally by numeral 13.

The heating unit consists of two cylindrical containers 18 and 19. They are of the same diameter and are axially aligned, but spaced from each other. It will be also noted that one of said cylinders 18 is considerably smaller, although this detail is optional. Both cylinders 18 and 19 rest on supports 20 based on blocks 43, and these in turn rest on floor 21 of the cabinet. Each cylinder is closed on both sides. The outer side of cylinder 19 is provided with an inlet 22, connected to the available water supply system. The inner end of the cylinder 19 is provided with a flange 23 and it is to this flange that the inner wall 25 is affixed by means of bolts 26. A gasket 24, in the form of a ring, is interposed between flange 23 and wall 25. The opposite cylinder 18 is constructed similarly, its outer end wall being provided with outlet 33 leading to faucet 14, while the inner wall 28, disc-like in shape, is affixed by means of bolts 26 to flange 27 to the inner end of said cylinder 18.

In order to provide a free passage of water from the larger cylinder, which is intended to contain cold water to be heated, to the smaller cylinder for hot water, I have connected said cylinders by a plurality of tubes 29 disposed radially all around a coil, 30, which by means of bushings 31 and 32 connects the respective cylinders 18 and 19. A gas burner 35 is disposed between the two tanks 18 and 19 and below said coil 30 and pipes 29. The space between the two tanks may, therefore, be considered a heating chamber. In order, however, to preserve heat and prevent it from being easily dissipated, I have constructed a covering for said heating chamber, said covering consisting of a stationary shell 36 at the back side of the tanks, and a cover 38 connected to the stationary shell by hinge 37, so that said cover may be raised when necessary. Said shell is supported on annular plates 41 concentric with flanges 23 and 27, one of which plates is connected to flange 23 on cylinder 19 and the other of which plates is affixed to flange 27 on cylinder 18. I wish to add that said shell and said cover are provided with insulation 39, which may be made of asbestos or some other suitable material. 40 indicates a vent for gas fumes.

Figure 4:
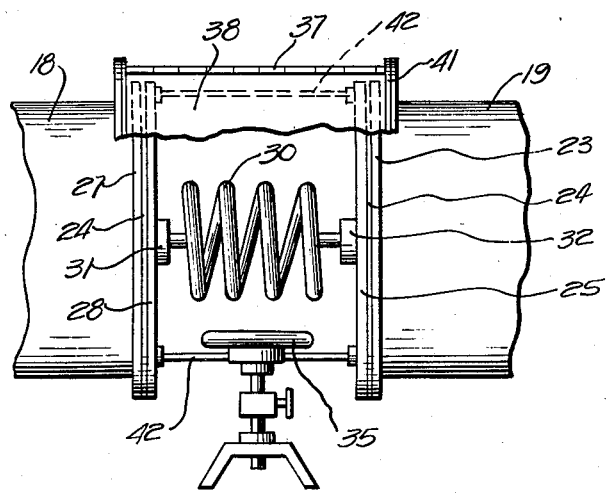
Fig. 4 shows a fragmentary side view of my heater with particular reference to a modification in the heating chamber of my heating unit.

It will be obvious that some changes may be introduced in this construction without departing from the spirit of my invention. Such a departure is shown in Fig. 4, where only a coil, 30, permits passage of water from one cylinder to another. In this case pipes 29 were entirely omitted. Since this would weaken the connection of the two tanks, said tanks are, in this case, held together by tie-rods 42. The situation may be reversed and instead of retaining the coil, pipes 29 alone may be retained and coil 30 may be eliminated. This, naturally, is optional.

The operation of the device is quite simple. When hot water is needed, gas is turned on and lighted. Water will be heated in the coil and in the pipes, as the case may be, and may be drawn off by means of faucet 14. The location of the heating chamber between the two tanks serves a special purpose, as heat generated by the gas burner heats not only water contained in coil and pipes, but also pre-heats water contained in the larger tank, so that by the time it enters tubes 29 and coil 30, it is already at a higher temperature than it would be if said water were drawn directly from the available water supplying system.

It is understood that some refinements may be made in the construction of my heater, such as raising the smaller tank to a somewhat higher level with respect to the cold water cylinder, so that there would be a natural tendency for warm water to accumulate there while cold water would remain in the larger and lower tank. It is also understood that the connecting pipes may be arranged differently without, however, departing from the spirit of my invention. I feel that my invention provides a compact heating unit, especially adapted to be connected with sinks in kitchens and lending itself to other similar purposes. What I, therefore, claim is as follows:

1. A water heater comprising a pair of horizontally disposed axially alined cylinders of unequal length, said cylinders being spaced from one another and being of the same diameter, a cold water inlet at the outer end of the longer cylinder, a hot water outlet at the outer end of the smaller cylinder, a horizontally disposed coiled pipe arranged within the space between the two cylinders and having its ends extending into the respective centers of the inner opposed ends of the spaced cylinders, a series of pipes interconnecting the spaced cylinders and arranged concentrically around the coiled pipe, heating means for said pipes arranged beneath the coiled pipe, and a cylindrical heat insulated shell embracing the inner end portions of the spaced cylinders and encasing the pipes and the heating means for the latter.

2. A water heater comprising a pair of horizontally disposed axially alined cylinders of the same diameter but of unequal length, said cylinders being spaced from one another, the inner ends of said cylinders facing each other being provided with flanges extending beyond the respective diameters of the cylinders, a cold water inlet at the outer end of the longer cylinder, a hot water outlet at the outer end of the smaller cylinder, a horizontally disposed coiled pipe arranged within the space between the two cylinders and having its ends extending into the respective centers of the inner opposed ends of the spaced cylinders, a series of pipes interconnecting the spaced cylinders, and arranged concentrically around the coiled pipe, heating means for said pipes arranged beneath the coiled pipe, and a cylindrical heat insulated shell embracing the inner end portions of the spaced cylinders and encasing the pipes and the heating means for the latter, said shell including a hinged portion provided with side plates to fit closely over said flanges.

STEVE LATANSKI.